(12) United States Patent
Basu et al.

(10) Patent No.: US 11,573,724 B2
(45) Date of Patent: Feb. 7, 2023

(54) SCOPED PERSISTENCE BARRIERS FOR NON-VOLATILE MEMORIES

(71) Applicant: Advanced Micro Devices, Inc., Santa Clara, CA (US)

(72) Inventors: Arkaprava Basu, Austin, TX (US);
Mitesh R. Meswani, Austin, TX (US);
Dibakar Gope, Madison, WI (US);
Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/432,391

(22) Filed: Jun. 5, 2019

(65) Prior Publication Data
US 2019/0286362 A1   Sep. 19, 2019

Related U.S. Application Data

(63) Continuation of application No. 15/274,777, filed on Sep. 23, 2016, now Pat. No. 10,324,650.

(51) Int. Cl.
*G06F 3/06* (2006.01)
*G06F 12/02* (2006.01)

(52) U.S. Cl.
CPC .......... *G06F 3/0647* (2013.01); *G06F 3/0619* (2013.01); *G06F 3/0659* (2013.01);
(Continued)

(58) Field of Classification Search
None
See application file for complete search history.

(56) References Cited

U.S. PATENT DOCUMENTS

| 8,977,838 B1* | 3/2015 | Mass ............... G06F 9/3897 712/246 |
| 2013/0091331 A1* | 4/2013 | Moraru ............ G06F 12/126 711/143 |

(Continued)

OTHER PUBLICATIONS

Pelley, S. et al.,"Memory Persistency", Proceeding of the 41st Annual International Symposium on Computer Architecture, Jun. 14-18, 2014, pp. 265-276, IEEE, Minneapolis, MN, USA.

(Continued)

*Primary Examiner* — Yaima Rigol
*Assistant Examiner* — Alexander J Yoon
(74) *Attorney, Agent, or Firm* — Volpe Koenig

(57) ABSTRACT

A processing apparatus is provided that includes NVRAM and one or more processors configured to process a first set and a second set of instructions according to a hierarchical processing scope and process a scoped persistence barrier residing in the program after the first instruction set and before the second instruction set. The barrier includes an instruction to cause first data to persist in the NVRAM before second data persists in the NVRAM. The first data results from execution of each of the first set of instructions processed according to the one hierarchical processing scope. The second data results from execution of each of the second set of instructions processed according to the one hierarchical processing scope. The processing apparatus also includes a controller configured to cause the first data to persist in the NVRAM before the second data persists in the NVRAM based on the scoped persistence barrier.

20 Claims, 4 Drawing Sheets

(52) U.S. Cl.
CPC .......... *G06F 3/0679* (2013.01); *G06F 3/0685* (2013.01); *G06F 12/0246* (2013.01)

(56) References Cited

U.S. PATENT DOCUMENTS

| | | | | |
|---|---|---|---|---|
| 2014/0365734 | A1* | 12/2014 | Bridge, Jr. ............ | G06F 12/084 711/144 |
| 2015/0089159 | A1* | 3/2015 | Busaba ............... | G06F 12/0815 711/144 |
| 2015/0106567 | A1* | 4/2015 | Godard ............... | G06F 12/1027 711/121 |
| 2015/0193158 | A1 | 7/2015 | Yoon et al. | |
| 2015/0378921 | A1* | 12/2015 | Karippara ........... | G06F 12/0888 710/308 |
| 2016/0092223 | A1* | 3/2016 | Wang ................. | G06F 9/30087 712/208 |

OTHER PUBLICATIONS

Condit, J. et al., "Better I/O Through Byte-Addressable, Persistent Memory", Proceedings of the ACM SIGOPS 22nd Symposium on Operating Systems Principles, Oct. 11-14, 2009, pp. 133-146, ACM, Big Sky, MT, USA.

Joshi, A. et al., "Efficient Persist Barriers for Multicores", Proceedings of the 48th International Symposium on Microarchitecture, Dec. 5-9, 2015, pp. 660-671, ACM, Waikiki, HI, USA.

Hower, D. et al., "Heterogeneous-race-free Memory Models", Proceedings of the 19th International Conference on Architectural Support for Programming Languages and Operating Systems, Mar. 1-5, 2014, pp. 427-440, ACM, Salt Lake City, UT, USA.

* cited by examiner

SCOPED PERSISTENCE BARRIERS FOR NON-VOLATILE MEMORIES

CROSS-REFERENCE TO RELATED APPLICATIONS

This application is a continuation of U.S. application Ser. No. 15/274,777, filed Sep. 23, 2016, the contents of which are incorporated herein by reference.

BACKGROUND

Non-volatile memory (e.g., read only memory (ROM)) and non-volatile storage devices maintain stored data when power is interrupted (e.g., battery is drained, computer is shut down, or computer is restarted). Due to certain limitations however, non-volatile memory is inefficient (e.g., increased cost and data access time) for use as main memory or primary storage. While use of random access memory (RAM), such as dynamic RAM (DRAM) and static RAM (SRAM) as main memory offers advantages over non-volatile memory, such as more efficient accessing of data, RAM is volatile memory which does not maintain its stored data when power supplied to the memory is interrupted.

Non-volatile memory types, such as non-volatile random access memory (NVRAM), continue to emerge as a replacement for, or as a supplement to, volatile RAM. Reliability of these non-volatile memory types as a main memory replacement or supplement is facilitated by the recoverability of persistent data structures to maintain instruction order after power is restored to the non-volatile memory.

BRIEF DESCRIPTION OF THE DRAWINGS

A more detailed understanding can be had from the following description, given by way of example in conjunction with the accompanying drawings wherein.

DETAILED DESCRIPTION

Figure 1:
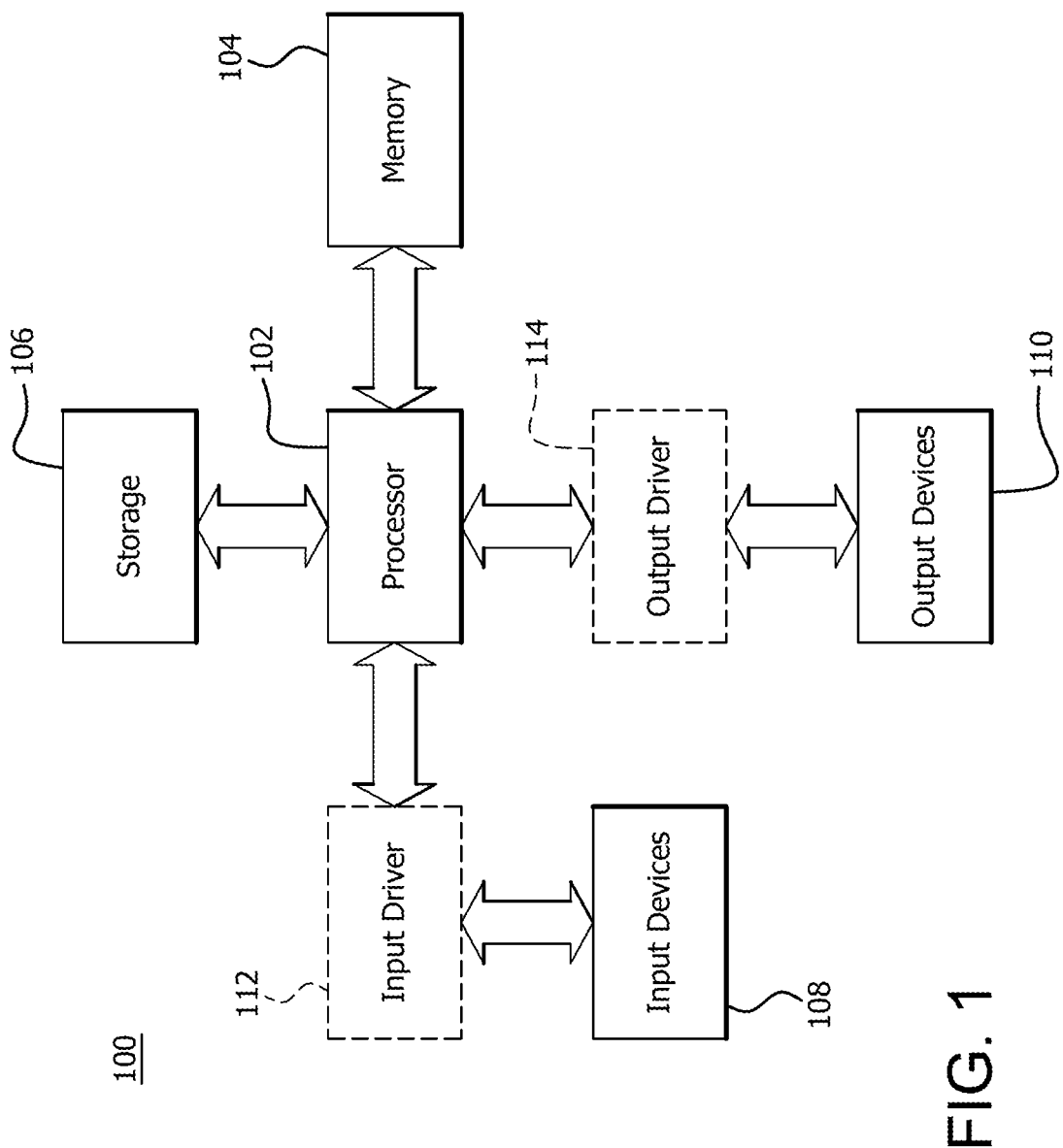
FIG. 1 is a block diagram of an example device in which scoped persistence barriers are implemented.

Programs includes sequence of instructions to be executed using one or more processors to perform procedures or routines (e.g., operations, computations, functions, processes, jobs). Processing of programmed instructions includes one or more of a plurality of processing stages, such as but not limited to fetching, decoding, scheduling for execution and executing the programmed instructions. Programmed instructions include store instructions which, when executed, store data resulting from their execution (also referred to hereinafter as output) from registers to memory.

Write back caching is a storage method in which data, resulting from the execution of the store instructions mapped (e.g., via a tag) to addresses in RAM, are temporarily stored in volatile memory (e.g., cache memory). The data resulting from the execution of the store instructions is later stored in RAM (i.e., written back to RAM), for example, at predetermined intervals or under certain conditions, such as when the outputs are evicted from a cache.

Non-volatile memory types used as a substitute for, or as a supplement to, main memory include, for example, non-volatile RAM (NVRAM), ferroelectric RAM (FRAM), conductive-bridging RAM (i.e., CBRAM) parallel random-access machine (PRAM), resistive RAM (i.e., RRAM) and Silicon-Oxide-Nitride-Oxide-Silicon (SONOS). For simplified explanation purposes, however, non-volatile memory types are referred to herein generally as NVRAM.

When NVRAM is used as a supplement or replacement for RAM, store instructions are configured to include additional mapping data (i.e., an extended tag) such that some instructions are mapped to addresses in volatile RAM and other instructions are mapped to addresses in NVRAM. For example, NVRAM memory addresses and volatile RAM addresses are partitioned in two corresponding contiguous ranges of memory such that one partition is used to map instructions to volatile RAM and another partition is used to map instructions to NVRAM. Based on the mapping data, the data resulting from the execution of store instructions mapped to RAM are written back to volatile RAM and the data resulting from the execution of store instructions mapped to the NVRAM are written back to NVRAM. The data resulting from execution of the instructions that are written back to NVRAM are maintained when power is interrupted. Program errors occur, however, when power is restored and the temporarily stored (e.g., cached) data resulting from execution of the instructions are not written back to NVRAM in the same order in which the instructions executed.

Maintaining the order in which store instructions execute is further complicated when store instructions are processed across multiple processors, such as in processing devices which include different processor types, such as CPUs and GPUs. Heterogeneous programming standards, such as OpenCL, manage or control (e.g., synchronize) the processing of programmed instructions across the different processors using a processing hierarchy comprising a plurality of processing scopes or execution units (hereinafter referred to as hierarchical processing scopes). For example, hierarchical processing scopes for OpenCL include sub-group scopes, workgroup scopes, device scopes and system scopes. Examples of other hierarchical processing scopes include, but are not limited to, work-item scopes, thread scopes, wavefront scopes, thread group scopes, kernel scopes and program scopes. While these hierarchical processing scopes facilitate synchronization of the processing of programmed instructions across multiple processors and different processor types, the hierarchical processing scopes used to process the instructions, such as store instructions, are not visible to memory.

Apparatuses and methods are disclosed herein which provide scoped persistence barriers that prevent out of order write backs to NVRAM and, in turn, prevent errors from occurring when power to the NVRAM is interrupted and then restored. The scoped persistence barriers facilitate write back ordering to the NVRAM by causing outputs of store instructions processed according to a scope and residing in a program before the barrier to persist in NVRAM before any outputs of store instructions processed according to the same scope and residing in the program after the barrier.

A processing apparatus is provided that includes NVRAM and one or more processors configured to process a first set of a plurality of instructions of a program according to one of a plurality of hierarchical processing scopes, a second set of the plurality of instructions of the program according to the hierarchical processing scope and a scoped persistence barrier residing in the program after the first set of instructions and before the second set of instructions. The scoped persistence barrier includes an instruction to cause first data to persist in the NVRAM before second data persists in the NVRAM. The first data results from execution of each of the first set of instructions processed according to the one hierarchical processing scope and the second data results from execution of each of the second set of instructions processed according to the one hierarchical processing scope. The processing apparatus also includes a controller configured to cause the first data to persist in the NVRAM before the second data persists in the NVRAM based on the scoped persistence barrier.

A computer implemented method of maintaining instruction order using NVRAM includes receiving a first set of a plurality of instructions of a program and receiving a second set of the plurality of instructions of the program. Each received instruction of the first set of instructions is to be processed according to one of a plurality of hierarchical processing scopes and each received instruction of the second set of instructions is to be processed according to the one hierarchical processing scope. The method also includes receiving a scoped persistence barrier residing in the program after the first set of instructions and before the second set of instructions. The scoped persistence barrier includes an instruction to cause first data to persist in the NVRAM before second data persists in the NVRAM. The first data results from execution of each of the first set of instructions processed according to the one hierarchical processing scope and the second data results from execution of each of the second set of instructions processed according to the one hierarchical processing scope. The method further includes causing the first data to persist in the NVRAM before the second data persists in the NVRAM.

A non-transitory computer readable medium is provided that includes a computer readable instruction sequence for causing a computer to execute a method that includes receiving a first set of a plurality of instructions of a program and receiving a second set of the plurality of instructions of the program. Each received instruction of the first set of instructions is to be processed according to one of a plurality of hierarchical processing scopes and each received instruction of the second set of instructions is to be processed according to the one hierarchical processing scope. The method executed by the computer also includes receiving a scoped persistence barrier residing in the program after the first set of instructions and before the second set of instructions. The scoped persistence barrier includes an instruction to cause first data to persist in the NVRAM before second data persists in the NVRAM. The first data results from execution of each of the first set of instructions processed according to the one hierarchical processing scope and the second data results from execution of each of the second set of instructions processed according to the one hierarchical processing scope. The method executed by the computer further includes causing the first data to persist in the NVRAM before the second data persists in the NVRAM.

FIG. 1 is a block diagram of an exemplary device 100. The device 100 includes, for example, a computer, a gaming device, a handheld device, a set-top box, a television, a mobile phone, or a tablet computer. As shown in FIG. 1, exemplary device 100 includes a processor 102, memory 104, a storage 106, one or more input devices 108, one or more output devices 110, an input driver 112 and an output driver 114. It is understood that the device 100 can include additional components not shown in FIG. 1.

Exemplary processor types for processor 102 include a CPU, a GPU, a CPU and GPU located on the same die, or one or more processor cores, wherein each processor core is a CPU or a GPU. Memory 104 is, for example, located on the same die as the processor 102 or located separately from the processor 102. Exemplary memory types for memory 104 include a volatile or non-volatile memory, for example, random access memory (RAM), dynamic RAM, or a cache.

Exemplary storage types for storage 106 include a fixed or removable storage, for example, a hard disk drive, a solid state drive, an optical disk, or a flash drive. Exemplary input device types for input device 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Exemplary output device types for output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
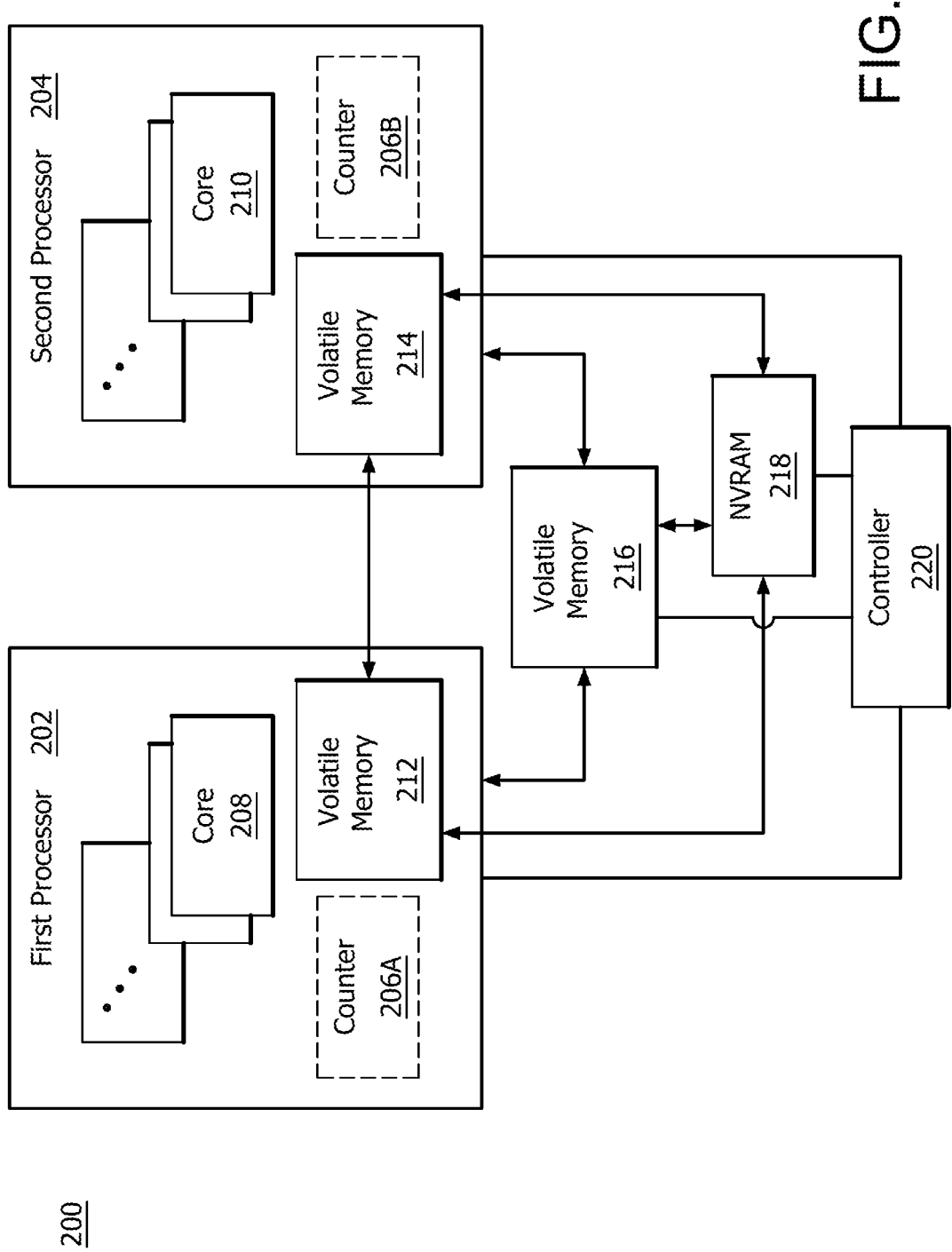
FIG. 2 is a block diagram of exemplary processing apparatus components used to implement scoped persistence barriers.

FIG. 2 is a block diagram illustrating exemplary components of a processing apparatus 200 used to maintaining instruction order using non-volatile memory. Each component shown in FIG. 2 is, for example, part of the exemplary device 100 shown in FIG. 1. As shown in FIG. 2, processing apparatus 200 comprises a first processor 202 and a second processor 204. First processor 202 includes processor cores 208 (e.g., single instruction multiple data SIMD cores) and volatile memory portion 212, which is shared by any number of the processor cores 208. Second processor 204 includes processor cores 210 (e.g., SIMD cores) and volatile memory portion 214, which is shared by any number of the processor cores 210. Examples of volatile memory portions 212 and 214 include cache memory (e.g., L1 cache or other levels) and memory buffers (e.g., first-in first-out buffers (FIFO buffers) in communication with cache memory. As shown in FIG. 2, processors 202 and 204 include optional counters 206A and 206B, indicated by dashed lines. Any numbers of cores 208 and 210 are, for example, combined into larger processing portions, such as compute units, which are, for example, allocated to one of volatile memory portions 212 and 214 (e.g., cache memory portion).

As shown in FIG. 2, exemplary processing apparatus 200 also comprises volatile memory portion 216, which is shared by first processor 202 and second processor 204. Examples of volatile memory portion 216 include cache memory (e.g., next level caches), memory buffers and volatile random access memory (RAM), such as dynamic RAM (i.e., DRAM) and static RAM (i.e., SRAM).

As shown in FIG. 2, exemplary processing apparatus 200 also includes NVRAM 218. Data is transferable between each of the volatile memory portions 212, 214, 216 and NVRAM 218. For example, data is directly transferable between NVRAM 218 and volatile memory portions 212 and 214. Data is also indirectly transferable between NVRAM 218 and volatile memory portions 212 and 214 via volatile memory portion 216. The number of processors, processor cores, and memory portions shown in FIG. 2 is merely exemplary. The number of memory levels shown in FIG. 2 is also exemplary.

Programmed instructions reside in an order (e.g., an order in which they are programmed or compiled) within the program. As described above, heterogeneous programming standards, such as OpenCL, manage or control the processing of programmed instructions across the different processors using a processing hierarchy comprising a plurality of processing scopes which include for example, work-items, wavefronts, workgroups, kernels and programs.

Processors 202 and 204 as well as processor cores 208 and 210 are configured to process instructions, such as store instructions according to different hierarchical processing scopes, such as for example, work-items, wavefronts, workgroups, kernels and programs. For example, processors 202 and 204 and processor cores 208 and 210 are configured to process a first set of instructions of a program according to a hierarchical processing scope and a second set of instructions according to the same hierarchical processing scope. Processors 202 and 204 and processor cores 208 and 210 are also configured to process scoped persistence barrier instructions which reside in the program after the first set of instructions and before the second set of instructions.

Portions of cache memory (e.g., portions or sub-portions of volatile memory portions 212, 214 and 216) are configured to temporarily cache data resulting from execution of the store instructions that are processed according to different hierarchical processing scopes. For example, different portions of cache memory are allocated to store data resulting from the execution of corresponding instruction sets according to the same hierarchical processing scope or, alternatively, a single portion of cache memory is allocated to store data resulting from the execution of multiple instruction sets according to the same hierarchical processing scope. Portions of cache memory can also be associated with buffer portions configured to buffer data stored in the portions of cache memory that result from execution of instructions mapped to NVRAM.

Processing apparatus 200 also includes controller 220, which includes any number of processors and/or circuitry configured to process (fetch, receive, decode, schedule and execute) instructions. As used herein, programmed instructions (e.g., compiled instructions) are received (e.g., read or fetched) in an order in which they reside in the program. As shown in FIG. 2, controller 220 is in communication with first processor 202 (including any of its components), second processor 204 (including any of its components), volatile memory portions 212, 214, 216 and NVRAM 218. Additional communication between controller 220 and other components (not shown) includes, for example, communication with components shown in FIG. 1 and other components, such as registers, additional processors and other memory portions.

Controller 220 is configured to receive (e.g., fetch or read) programmed instructions, including store instructions. For example, controller 220 is configured to receive a first set and a second set of instructions of a program to be processed (e.g., executed) by one or more processors and cause the first data and the second data to be temporarily cached in one or more portions of cache memory (e.g., portions or sub-portions of volatile memory portions 212, 214 and 216).

Controller 220 is also configured to receive scoped persistence barrier instructions. For example, controller 220 is configured to receive a scoped persistence barrier instruction associated with the same hierarchical processing scope as the first set and second set of instructions and which resides in the program after the first set of instructions and before the second set of instructions.

Controller 220 is further configured to cause data (e.g., first data), resulting from instructions (e.g., first instruction set) processed according to a scope and residing in the program before a scoped persistence barrier instruction associated with the same scope, to persist in NVRAM 218 before other data (e.g., second data) resulting from instructions (e.g., second instruction set) processed according to the same scope and residing in the program after the received scoped persistence barrier instruction. For example, controller 220 is configured to cause the first data to persist in NVRAM 218 before the second data persists in the NVRAM 218 using identification data (i.e., mapping data) which identifies each of the first set of instructions as being mapped to one of volatile RAM of volatile memory portion 216 and the NVRAM 218. For example, controller 220 identifies, via the identification data, portions of the first data and portions of the second data resulting from execution of instructions mapped to the NVRAM 218 and moves the identified portions of the first data mapped to the NVRAM 218 from the volatile memory portion 212, 214 or 216 to NVRAM 218 before the identified portions of the second data is moved from the volatile memory portion 212, 214 or 216 to the NVRAM 218.

Identification of data stored in volatile memory includes, for example, (1) allocating portions of cache memory for data resulting from execution of corresponding instruction sets processed according to a hierarchical processing scope and (2) identifying data stored in one portion of cache memory as the first data and data stored in an another portion of the cache memory as the second data. Identification of data stored in volatile memory includes, for example, identifying first data and second data stored in the same portion of cache memory by using cache tags configured to identify the first data and the second data stored in the same portion of cache memory.

As used herein, each work-item represents an instantiation of a program that is to be executed in a portion (e.g., a lane of a SIMD unit) of a processor (e.g., processor 202, processor 204, processor core 208 or processor core 210). A workgroup includes a plurality of work-items each designated to execute a portion of a program. Work-items are, for example, executed simultaneously as a wavefront on a single processor. Workgroups also include, for example, multiple wavefronts.

Figure 3:
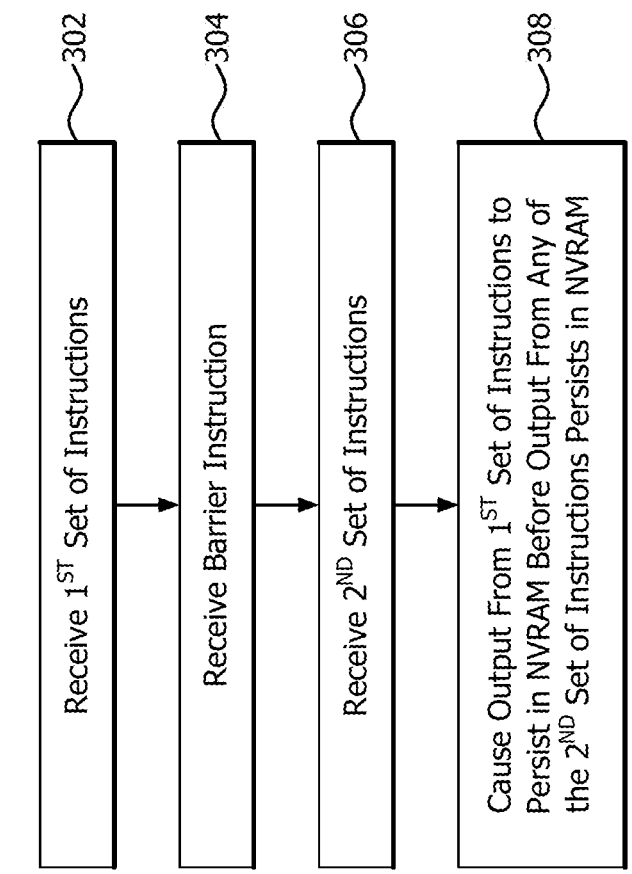
FIG. 3 is a flow diagram illustrating an exemplary method of maintaining write back order to NVRAM using scoped persistence barriers.

FIG. 3 is a flow diagram 300 illustrating an exemplary method of maintaining write back order to NVRAM. As shown at block 302 in FIG. 3, the method comprises receiving (e.g., fetch or read) a first set of store instructions residing in a program to be processed (e.g., decoded, scheduled for execution, and executed) according to one of a plurality of hierarchical processing scopes, such as, for example, a work-item hierarchical processing scope, a wavefront hierarchical processing scope, a workgroup hierarchical processing scope, a kernel hierarchical processing scope and a program hierarchical processing scope.

As shown at block 304 in FIG. 3, the method comprises receiving a scoped persistence barrier. The scoped persistence barrier comprises an instruction to cause first data, resulting from execution of each of the first set of store instructions associated with one hierarchical processing scope, to persist in the NVRAM before second data, resulting from execution of each of a second set of store instructions associated with the one hierarchical process scope.

As shown at block 306 in FIG. 3, the method comprises receiving the second set of instructions to be processed (e.g., decoded, scheduled for execution, and executed) according to the one hierarchical processing scope. The second set of instructions resides in the program after the scoped persistence barrier.

Each of the first set of instructions and each of the second set of instructions are executed in an order of execution. The first data and the second data, which results from the execution of the first and second sets of instructions, respectively, are temporarily cached in nonvolatile memory.

As shown at block 308 in FIG. 3, the method comprises causing the first data to persist in the NVRAM before the second data persists in the NVRAM. That is, execution of the scoped persistence barrier causes the first data from the first set of instructions to persist in the NVRAM before the second data from the second set of instructions. Accordingly, out of order write backs to NVRAM are prevented. Further, program errors, due to out of order write backs, are prevented when power to the NVRAM is interrupted and then restored.

By way of example, the first and second sets of instructions are now described with respect to different hierarchical scopes.

For a work-item hierarchical processing scope, the barrier comprises an instruction to cause the first data resulting from execution of each of the first set of instructions processed according to the work-item hierarchical processing scope to persist in the NVRAM before the second data resulting from execution of each of the second set of instructions processed according to the work-item hierarchical process scope persists in the NVRAM. For example, a work-item persistence barrier comprises an instruction which causes stores from a work-item residing in the program before the barrier to persist in the NVRAM before any stores from the work-item residing in the program after the barrier persists in the NVRAM. Stores to persistent memory by other work-items are not ordered by the work-item persistence barrier.

For a wavefront hierarchical processing scope, the barrier comprises an instruction to cause the first data resulting from execution of each of the first set of instructions processed according to the wavefront hierarchical scope to persist in the NVRAM before the second data resulting from execution of each of the second set of instructions processed according to the wavefront hierarchical process scope persists in the NVRAM. Wavefront scoped persistence barriers are facilitated when work of work-items in a wavefront are correlated (e.g., when work-items of a given wavefront insert multiple independent entries which fall in the same hash bucket).

For a workgroup hierarchical processing scope, the barrier comprises an instruction to cause the first data resulting from execution of each of the first set of instructions processed according to the workgroup hierarchical processing scope comprising a group of work-items to persist in the NVRAM before the second data resulting from execution of each of the second set of instructions processed according to the workgroup hierarchical process scope persists in the NVRAM. Persistence operations from different workgroups executing on the same or different processor or compute unit are not ordered by a workgroup level persistence barrier.

For a kernel hierarchical processing scope, the barrier comprises an instruction to cause the first data resulting from execution of each of the first set of instructions processed according to the kernel hierarchical scope to persist in the NVRAM before the second data resulting from execution of each of the second set of instructions processed according to the kernel hierarchical process scope persists in the NVRAM.

For a program hierarchical processing scope, the barrier comprises an instruction to cause the first data resulting from execution of each of the first set of instructions processed according to the program hierarchical scope to persist in the NVRAM before the second data resulting from execution of each of the second set of instructions processed according to the program hierarchical process scope persists in the NVRAM.

When each of the first set of store instructions execute (collectively providing first data), the resulting first data is temporarily stored in volatile memory, such as cache memory or memory buffers. As described above, some instructions of a program are mapped to addresses in volatile RAM while other instructions of the program are mapped to addresses in NVRAM. Accordingly, the mapping data is utilized to identify the first data from instructions mapped to volatile RAM and later write back this first data to volatile RAM and identify the first data from instructions mapped to NVRAM and later write back this first data to NVRAM.

Likewise, when each of the second set of store instructions execute (collectively providing second data), the resulting second data is temporarily stored in volatile memory. The mapping data is utilized to identify the second data mapped to volatile RAM and later write back this second data to volatile RAM and identify the second data from instructions mapped to NVRAM and later write back this second data to NVRAM.

For temporarily stored (i.e., cached) data associated with a processing scope that is mapped to NVRAM, identification of the data in volatile memory includes: (1) configuring a cache tag to identify data temporarily stored in volatile memory as first data or second data; and (2) allocating portions of cache memory to outputs resulting from corresponding sets of instructions (e.g., first set or second set) processed according to a processing scope. Further, counters, such as counters 206A and 206B shown in FIG. 2, can be used to track (e.g., incrementing or decrementing a count) whether data resulting from execution of each instruction from a set of instructions (e.g., each instruction from the first set of instructions) is persisted in NVRAM.

When identification of the data in volatile memory includes configuring the cache tag, the first data resulting from execution of the first set of instructions processed according to a processing scope is stored concurrently in the same portion of cache memory with the second data resulting from execution of the second set of instructions processed according to the same processing scope. Accordingly, when a scoped persistence barrier associated with the same processing scope is received, the first data resulting from an instruction is not caused to persist in NVRAM (i.e., moved from the portion of cache memory to NVRAM) and is permitted to remain in the portion of cache memory until a condition occurs, such as an expiration of a predetermined interval or an occurrence of an event (e.g., eviction of data from a portion of cache) because the first data is distinguished from the second data in the same portion of the cache memory via the cache tag.

When identification of the data in volatile memory includes allocating portions of cache memory according to processing scopes, the first data is stored in a first portion of cache memory and the second data is stored in a second portion of cache memory. That is, the first data is not stored concurrently in the same portion of cache memory with the second data. When a scoped persistence barrier associated with the same processing scope is received, the first data is not permitted to remain in the first portion of cache memory and is caused to persist in NVRAM before the second data is caused to persist in NVRAM without waiting for a condition to occur.

Further, efficient identification of the data in each portion of cache memory is facilitated by using buffers (e.g., first-in first-out (FIFO) buffers) associated with each allocated portion of cache memory to buffer a portion of the cached data (also referred to herein as NV writes) resulting from execution of instructions that are mapped to NVRAM. For example, when a scoped persistence barrier instruction is received, a portion of the first data stored in the FIFO buffer is efficiently identified as first data resulting from execution of the first set of instructions processed according to a processing scope and mapped to NVRAM. Remaining portions of the cached data are not searched, thereby decreasing time incurred to persist the data in NVRAM.

Data from an instruction mapped to NVRAM remains in cache memory until it is naturally evicted or flushed by a scoped persistence barrier. A persist flush operation is initiated by the execution of scoped persistence barrier that inserts a marker (e.g., p_flush) into the FIFO buffer (e.g., L1 FIFO) associated with a portion of cache memory allocated to data resulting from an instruction set processed according to a given processing scope. The marker initiates de-queuing of the FIFO and propagating data from instructions mapped to NVRAM (e.g., through lower level caches or directly to NVRAM). The process of flushing writes and de-queuing the FIFO continues until the marker reaches the head of the L1 FIFO. The process also continues at each cache level. The FIFO is also flushed when its capacity is reached to accommodate a new data from an instruction mapped to NVRAM. When a naturally evicted NV write or capacity induced NV write flush reaches the next cache level, the NV write is cached to the next level and tracked by the next level cache FIFO. A capacity induced NV write flush or naturally evicted NV write from a particular level (e.g., next level, predetermined level, lowest level) cache is persisted.

When a single FIFO is used for a portion of a processor (e.g., a compute unit), the execution of a scoped persistence barrier in the compute unit drains the FIFO irrespective of its scope. A flush marker, initiating from a cache, drains the NV writes tracked by the next level cache FIFO as well. Some NV writes persist earlier than those provided using a scoped persistency operation.

Implementation of FIFO buffers according to different types of scoped persistence barriers is now described.

The execution of a work-item-scoped persistence barrier sends a flush marker to the FIFO. The flush marker de-queues the FIFO and flush the outstanding NV writes from the cache to the next level cache. When the marker reaches the head of the FIFO, the flush marker is propagated to the next level FIFO. The flush marker initiates the de-queuing of the next level FIFO and flushes the NV writes to the NVRAM. After de-queuing the next level FIFO, the next level cache waits for acknowledgements from the NVRAM confirming that the NV writes are persisted. When the next level FIFO receives acknowledgement from NVRAM, it forwards this acknowledgement to preceding level cache which forwards it to the work-item that issued the flush, thereby notifying the work-item about the completion of persistence writes. Upon the completion of execution of the scoped persistence barrier, the work-item is blocked from waiting for an acknowledgment from the memory subsystem. In some processors (e.g., a GPU), the minimum granularity of work scheduling is a wavefront and blocking a single work-item will effectively block the wavefront comprising the work-item. Additional wavefront contexts can, however, be scheduled onto available execution resources to avoid any unutilized cycles of that hardware.

Unlike work-item scoped persistence barriers, a wavefront scoped persistence barrier causes NV writes from each work-item of the wavefront to persist before moving any further with the execution. Accordingly, the first step in a wavefront scope is to cause writes from each work-item of a wavefront to be visible to the cache, which is facilitated by an execution barrier which causes each work-item to perform the writes to the cache and causes the queuing of NV writes from the wavefront to the FIFO. The last work-item that reaches the barrier adds a flush marker into the FIFO and the wavefront waits for an acknowledgement from memory sub-system. Similar to work-item scoped persistence barrier flush, the flushing of outstanding NV writes is triggered from the first level cache and the next level cache to NVRAM and NV memory acknowledging back once the writes are persisted. When the wavefront receives that acknowledgement, it resumes execution.

A work group scoped persistence barrier causes NV writes from each work-item of that work group to persist before moving any further with the execution. Similar to wavefront scoped persistence barriers, the first step for a work group scope is to cause writes from each work-item of a work-group to be visible to the cache with the help of an execution barrier. A work group scoped persistence barrier also causes the queuing of NV writes from the work group to the FIFO. The last work-item that reaches the execution barrier then adds a flush marker into the FIFO and the work-group waits for an acknowledgement from memory sub-system, which triggers the flushing of outstanding NV writes from the cache and the next level cache to NVRAM and NVRAM acknowledging back once the writes are persisted. When the work-group receives that acknowledgement, it resumes execution. Stalling execution of a work-group until the prior writes before the scoped persistence barriers persist results in an epoch persistency. When multiple work-groups execute concurrently, the cycles spent in saving NV writes to memory from a work-group are mostly hidden by the overlapping/concurrent execution of other work-groups in the compute unit, thereby adhering to the epoch persistency model without impacting performance as long as execution finds enough concurrent work-groups to hide the latency.

Kernel scoped persistence barriers cause NV writes from each work group of a kernel to be visible to their corresponding caches. A kernel level execution barrier includes the synchronization of each work group in a kernel, including the work-groups that are not currently scheduled because of resource constraints. Alternatively, a kernel-scoped persistence barrier is implemented as a pseudo-return instruction that finishes the execution of a kernel and does not provide a system-scoped visibility release caused by a normal kernel return instruction. This instruction behaves like a work group scoped persistence barrier that synchronizes the work-items in a workgroup and adds a flush marker on the FIFO. The pseudo-return instruction completes after receiving a persist-acknowledgement from the memory sub-system after which the workgroups finishes execution. When each work group in the kernel completes execution after the kernel-scoped persistence barrier is executed, each FIFO is flushed and each write from that kernel is persisted. A new kernel is invoked to do the pending work. The new kernel invocation is a pseudo-invocation without any kernel launch overhead, however, because it is the continuation of the original kernel after the execution of a pseudo-return instruction. Additionally, the lack of a visibility release operation by the pseudo-return instruction causes the caches to be maintained in its original state, avoiding any cache warm up delays. A kernel-scoped kernel barrier is implemented without any complex modifications to the GPU microarchitecture and is implemented without any additional performance overhead.

Unlike scoped persistence barriers, a program scope persistence barrier causes each NV writes still pending to be persisted. A program scoped persistence barrier also includes, for example, causing the flushing of FIFO buffers and persisting the data in the buffers to NVRAM before proceeding with execution. FIFO buffers across each of the processor executing the program are flushed and persisted.

Figure 4:
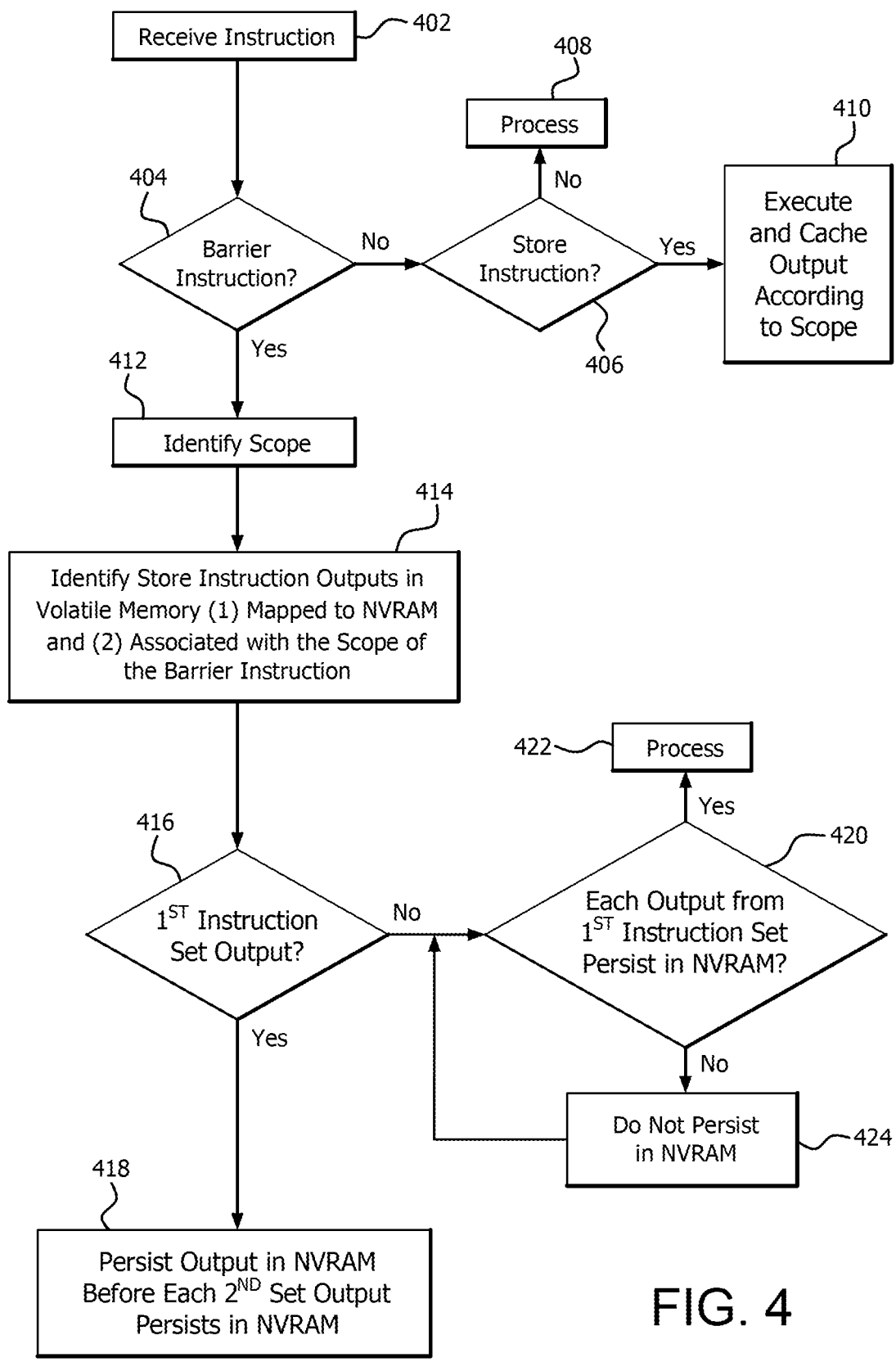
FIG. 4 is a flow diagram illustrating an exemplary method of processing instructions to maintain write back order to NVRAM using scoped persistence barriers.

FIG. 4 is a flow diagram illustrating an exemplary method of processing instructions to maintain write back order to NVRAM using scoped persistence barriers.

As shown at block 402 in FIG. 4, the method 400 includes receiving an instruction to be processed according to one of a plurality of different hierarchical processing scopes. As shown at decision block 404, the method 400 includes determining whether the instruction is a scoped persistence barrier instruction. When the instruction is determined not to be a scoped persistence barrier instruction, the method proceeds to decision block 406.

As shown at decision block 406, the method 400 includes determining whether the instruction is a store instruction. When the instruction is determined, at decision block 406, not to be a store instruction (e.g., a load instruction), the method proceeds to decision block 408 and the instruction is processed (e.g., scheduled for execution, decoded and executed). When the instruction is determined, at decision block 406, to be a store instruction, the method proceeds to block 410.

As shown at decision block 410, the store instruction is executed and the output (i.e., data) resulting from the execution of the instruction is stored (e.g., cached, buffered) according to its hierarchical processing scope. For example, the data is stored in a portion of cache memory allocated for data (e.g., first data) resulting from the execution of each instruction of the same instruction set (e.g., first instruction set) processed according to a hierarchical processing scope or, alternatively, the data is stored in a portion of cache memory allocated for data (e.g., first data or second data) resulting from the execution of multiple instruction sets (e.g., first instruction set and second instruction set) which reside both before and after the barrier and are processed according to a hierarchical processing scope. The first data can also be buffered in buffer memory (e.g., FIFO buffer) associated with the portion of the cache memory allocated for the first data when the first instruction set is mapped to the NVRAM.

Referring back to decision block 404, when the instruction is determined to be a scoped persistence barrier instruction, the scope associated with the persistence barrier instruction is identified at block 412. The scope associated with the persistence barrier instruction is identified as one of a plurality of different hierarchical processing scopes (e.g., work-item scope, wavefront scope, work group scope, kernels scope and program scope).

When the scope associated with the persistence barrier instruction is identified, the method 400 includes identifying, at block 414, which of the outputs in volatile memory: (1) result from the execution of store instructions (i.e., executed and cached at block 410) having memory addresses corresponding to addresses in NVRAM (i.e., mapped to NVRAM); and (2) are associated with the identified hierarchical processing scope of the scoped persistence barrier instruction.

As described above, when data is buffered in buffer memory (e.g., FIFO buffer) associated with the portion of the cache memory, the data buffered in the buffer memory portion is efficiently identified as data resulting from the execution of store instructions mapped to NVRAM. Further, the corresponding processing scopes of the stored data are identified by the portions of volatile memory (e.g., portions of cache memory) in which they are stored.

When a stored instruction output is identified as being mapped to NVRAM and associated with the barrier instruction scope, the method proceeds to decision block 416. At decision block 416, it is determined whether the identified data results from execution of one of the first set of instructions which resides in the program before the scoped persistence barrier. For example, the identified data is determined to result from execution of one of the first set of instructions when the data is stored in a portion of cache memory allocated for first data or, alternatively, the identified data is determined to result from execution of one of the first set of instructions by a cache tag.

When the identified data is determined, at decision block 416, to be first data resulting from execution of one of the first set of instructions, the first data is persisted in NVRAM before any of the stored second data resulting from execution of the second set of instructions residing in the program after the scoped persistence barrier, as shown at block 418.

When the identified data is determined, at decision block 416, not to be first data (i.e., the identified data is second data), the method proceeds to decision block 420 to determine whether the first data from each of the first set of instructions persists in NVRAM. When it is determined, at decision block 420, that the first data from each of the first set of instructions persists in NVRAM, the data is processed (e.g., according to a processing procedure before the scoped persistence barrier was received, according to the programmed instructions or persisted to NVRAM), as shown at block 422.

When it is determined, at decision block 420, that first data resulting from execution of any of the first set of instructions does not yet persist in NVRAM, the second data is prevented from persisting in NVRAM, as shown at block 424. The method 400 proceeds back to decision block 420 to re-determine whether to continue to prevent the second data from persisting in NVRAM.

The re-determination is performed, for example, at predetermined intervals, upon request or upon the occurrence of an event (e.g., eviction of second data from cache memory or first data persisted to NVRAM.

It should be understood that many variations are possible based on the disclosure herein. Although features and elements are described above in particular combinations, each feature or element can be used alone without the other features and elements or in various combinations with or without other features and elements.

The methods provided include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements scoped persistence barriers.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing apparatus comprising:
   non-volatile random access memory (NVRAM);
   cache memory comprising cache memory portions;
   one or more processors configured to process:
      a first set of instructions of a program according to one hierarchical processing scope level of a plurality of different hierarchical processing scope levels corresponding to different types of instruction sets of the program;
      a second set of instructions of the program according to the one hierarchical processing scope level; and
      a scoped persistence barrier, residing in the program after the first set of instructions and before the second set of instructions, comprising an instruction to cause first data in the cache memory to persist in the NVRAM before second data in the cache memory persists in the NVRAM; and
   a controller configured to:
      identify the scoped persistence barrier to be associated with the one hierarchical processing scope level and the first data and the second data in the cache memory to be associated with the one hierarchical processing scope level and mapped to the NVRAM; and
      cause the first data to persist in the NVRAM before the second data persists in the NVRAM based on the scoped persistence barrier, wherein
   when identification of the first and second data in the cache memory includes allocating the cache memory portions according to the one hierarchical processing scope level, the first data is stored in a first cache memory portion and the second data is stored in a second cache memory portion.

2. The processing apparatus of claim 1, wherein when identification of the first and second data in the cache memory includes configuring a first cache tag identifying the first data and a second cache tag identifying the second data, the first data and the second data are stored concurrently in one portion of the cache memory.

3. The processing apparatus of claim 2, wherein the controller is configured to cause the first data to persist in the NVRAM before the second data persists in the NVRAM by determining to: configure the first and second cache tags and identify the first and second data in the one portion of the cache memory using the first and second cache tags; or allocate the first cache memory portion to the first data and the second cache memory portion to the second data, identify the first data in the first cache memory portion and identify the second data in the second cache memory portion.

4. The processing apparatus of claim 2, wherein when identification of the first and second data in the cache memory includes configuring the first cache tag and the second cache tag, the controller is configured to cause the first data to remain in the one portion of the cache memory and not persist in the NVRAM until a condition occurs, and
   when identification of the first and second data in the cache memory includes allocating the first and second cache memory portions according to the one hierarchical processing scope level, the controller is configured to move the first data from the first cache memory portion and cause the first data to persist in the NVRAM before the second data is caused to persist in the NVRAM without waiting for the condition to occur.

5. The processing apparatus of claim 4, wherein the condition is an expiration of a predetermined time interval.

6. The processing apparatus of claim 4, wherein the condition is an eviction of the first data from the one portion of the cache.

7. The processing apparatus of claim 1, wherein,
   the first data resulting from execution of each of the first set of instructions processed according to the one hierarchical processing scope level and the second data resulting from execution of each of the second set of instructions processed according to the one hierarchical processing scope level.

8. A computer implemented method of maintaining instruction order using non-volatile random access memory (NVRAM), the method comprising:
   receiving a first set of instructions of a program, each instruction of the first set of instructions to be processed according to one of a plurality of different hierarchical processing scope levels corresponding to different types of instruction sets of the program;
   receiving a second set of instructions of the program, each instruction of the second set of instructions to be processed according to the one hierarchical processing scope level of the plurality of different levels of hierarchical processing scope levels;
   receiving a scoped persistence barrier, residing in the program after the first set of instructions and before the second set of instructions, comprising an instruction to cause first data in a cache memory to persist in the NVRAM before second data in the cache memory persists in the NVRAM;
   identifying the scoped persistence barrier to be associated with the one hierarchical processing scope level;
   identifying the first data and the second data in the cache memory to be associated with the one hierarchical processing scope level and mapped to the NVRAM; and
   causing the first data to persist in the NVRAM before the second data persists in the NVRAM, wherein
   when identification of the first and second data in the cache memory includes allocating cache memory portions according to the one hierarchical processing scope level, the first data is stored in a first cache memory portion and the second data is stored in a second cache memory portion.

9. The method of claim 8, wherein when identification of the first and second data in the cache memory includes configuring a first cache tag identifying the first data and a second cache tag identifying the second data, the first data and the second data are stored concurrently in one portion of the cache memory.

10. The method of claim 9, wherein the method further comprises determining to: configure the first and second cache tags and identify the first and second data in the one portion of the cache memory using the first and second cache tags; or allocate a first cache memory portion to the first data and the second cache memory portion to the second data, identify the first data in the first cache memory portion and identify the second data in the second cache memory portion.

11. The method of claim 9, wherein the method further comprises: when identification of the first and second data in the cache memory includes configuring the first cache tag and the second cache tag, causing the first data to remain in the one portion of the cache memory and not persist in the NVRAM until a condition occurs, and when identification of the first and second data in the cache memory includes allocating the first and second cache memory portions according to the one hierarchical processing scope level, moving the first data from the first cache memory portion and causing the first data to persist in the NVRAM before the second data is caused to persist in the NVRAM without waiting for the condition to occur.

12. The method of claim 11, wherein the condition is an expiration of a predetermined time interval.

13. The method of claim 11, wherein the condition is an eviction of the first data from the one portion of the cache.

14. The method of claim 8, wherein the first data resulting from execution of each of the first set of instructions processed according to the one hierarchical processing scope level and the second data resulting from execution of each of the second set of instructions processed according to the one hierarchical processing scope level.

15. A non-transitory computer readable medium comprising a computer readable instruction sequence for causing a computer to execute a method of maintaining instruction order using non-volatile random access memory (NVRAM), the method comprising:
  receiving a first set of instructions of a program, each instruction of the first set of instructions to be processed according to one hierarchical processing scope level of a plurality of different hierarchical processing scope levels corresponding to different types of instruction sets of the program;
  receiving a second set of instructions of the program, each instruction of the second set of instructions to be processed according to the one hierarchical processing scope level of the plurality of different hierarchical processing scope levels;
  receiving a scoped persistence barrier residing in the program after the first set of instructions and before the second set of instructions, comprising an instruction to cause first data in a cache memory to persist in the NVRAM before second data in the cache memory persists in the NVRAM;
  identifying the scoped persistence barrier to be associated with the one hierarchical processing scope level;
  identifying the first data and the second data in the cache memory to be associated with the one hierarchical processing scope level and mapped to the NVRAM; and
  causing the first data to persist in the NVRAM before the second data persists in the NVRAM, wherein
  when identification of the first and second data in the cache memory includes allocating cache memory portions according to the one hierarchical processing scope level, the first data is stored in a first cache memory portion and the second data is stored in a second cache memory portion.

16. The computer readable medium of claim 15, wherein, the first data resulting from execution of each of the first set of instructions processed according to the one hierarchical processing scope level and the second data resulting from execution of each of the second set of instructions processed according to the one hierarchical processing scope level, and
when identification of the first and second data in the cache memory includes configuring a first cache tag identifying the first data and a second cache tag identifying the second data, the first data and the second data are stored concurrently in one portion of the cache memory.

17. The computer readable medium of claim 16, wherein the instructions further comprise determining to: configure the first and second cache tags and identify the first and second data in the one portion of the cache memory using the first and second cache tags; or allocate a first cache memory portion to the first data and the second cache memory portion to the second data, identify the first data in the first cache memory portion and identify the second data in the second cache memory portion.

18. The computer readable medium of claim 16, wherein the method further comprises: when identification of the first and second data in the cache memory includes configuring the first cache tag and the second cache tag, causing the first data to remain in the one portion of the cache memory and not persist in the NVRAM until a condition occurs, and when identification of the first and second data in the cache memory includes allocating the first and second cache memory portions according to the one hierarchical processing scope level, moving the first data from the first cache memory portion and causing the first data to persist in the NVRAM before the second data is caused to persist in the NVRAM without waiting for the condition to occur.

19. The computer readable medium of claim 18, wherein the condition is an expiration of a predetermined time interval.

20. The computer readable medium of claim 18, wherein the condition is an eviction of the first data from the one portion of the cache.

* * * * *